March 22, 1927.

M. BAKKER 1,621,575

EAR CORN CLEANER

Filed Aug. 15, 1924    2 Sheets-Sheet 1

Manton Bakker
INVENTOR

BY Victor J. Evans
ATTORNEY

WITNESS: J. L. Wright

March 22, 1927.
M. BAKKER
1,621,575
EAR CORN CLEANER
Filed Aug. 15, 1924   2 Sheets-Sheet 2
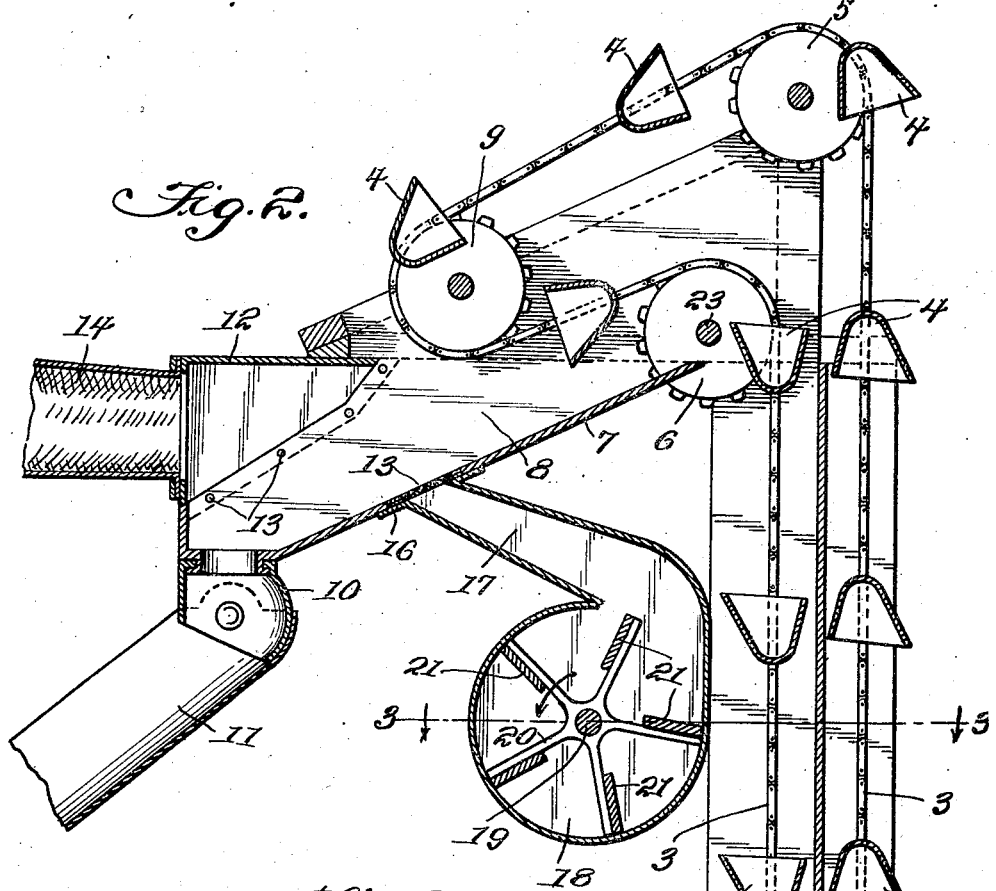
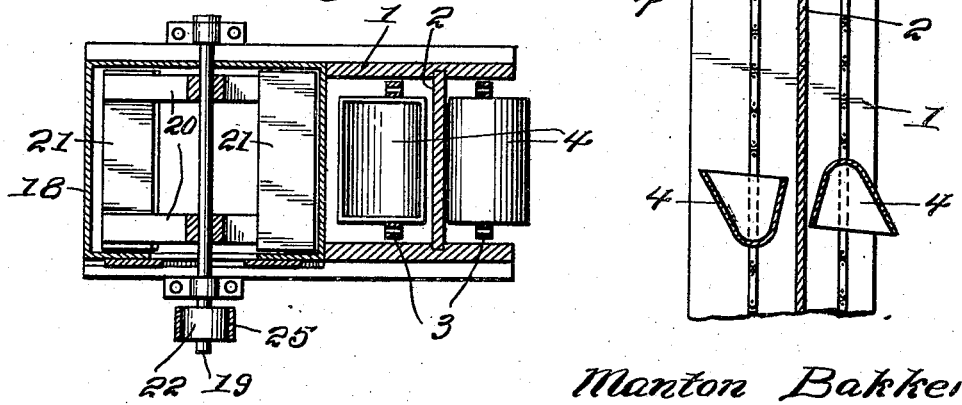
Manton Bakker
INVENTOR
BY Victor J. Evans
ATTORNEY
WITNESS J. T. L. Wright Patented Mar. 22, 1927.

1,621,575

UNITED STATES PATENT OFFICE.

MANTON BAKKER, OF GRUNDY CENTER, IOWA.

EAR-CORN CLEANER.

Application filed August 15, 1924. Serial No. 732,298.

The soft fibre from between the rows of corn contains a moisture which is imparted to the corn, causing the same to mold and decay. For this reason a large quantity of stored corn soon becomes spoiled, and, of course, unfit for use. It may therefore be considered the primary object of this invention to provide a simple means for removing the soft fibre or what is commonly termed "silk" from between the ears of corn during the process of storing the corn.

A further object is the provision of means actuated by the corn elevating means for forcing a blast of air through the hopper associated with the elevator whereby the corn silk will be removed from the ears of corn before the same are fed into the spout leading to the bins.

To the attainment of the foregoing and other objects which will present themselves as the nature of the invention is better understood, reference is to be had to the drawings which accompany and which form part of this application.

In the drawings:—

Figure 2 is an approximately central vertical longitudinal sectional view therethrough.

Figure 3 is a sectional view on the line 3—3 of Figure 2.

Figure 1:
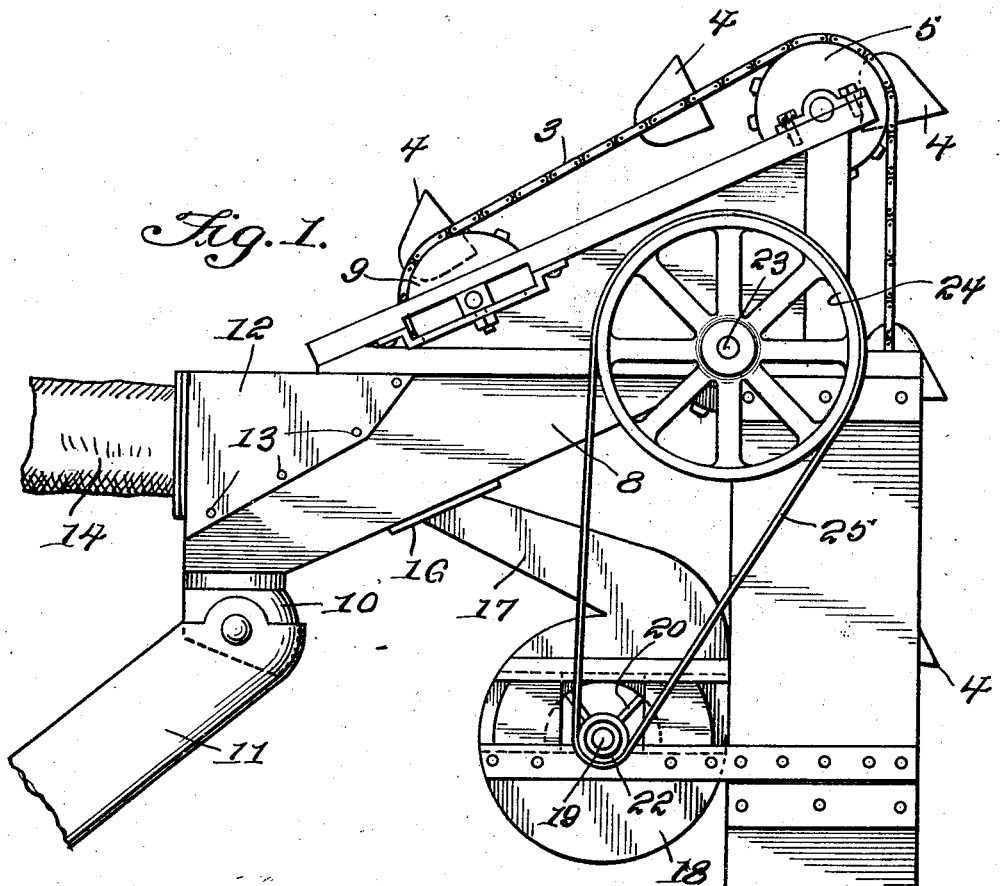
Figure 1 is a side elevation illustrating the improvement.
Figure 4:
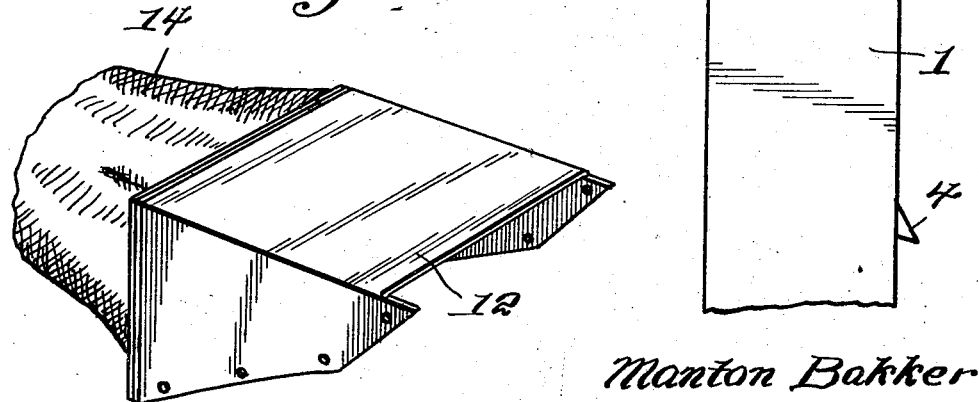
Figure 4 is a perspective view of the hood and the flexible conductor associated therewith.

In the drawings an elevator is indicated by the numeral 1. The casing is centrally divided by a partition 2, and on the opposite sides of the partition there are arranged the leads of a chain 3. Secured on the chain there are buckets 4 in which the ear of corn is deposited. The outer lead of the chain 3 is trained over a sprocket wheel 5 journaled at the top of the elevator. The inner lead of the chain is journaled over a similar sprocket wheel 6 arranged at the outlet mouth of the elevator and in a line with a downwardly inclined wall 7 of the hopper 8 into which the ear of corn is to be deposited. Both leads of the chain are trained around a sprocket wheel 9 suitably journaled in the hopper.

The hopper has swivelly secured to its lower and outlet end a semi-spherical casting 10 to the sides of which there is pivoted the conductor spout 11 for the ear of corn. The spout or lower end of the hopper has its top open in the usual manner but this opening in the present instance is closed by a metallic hood 12. The sides of the hood are bolted, as at 13, to the sides of the spout of the hopper. The outer end of the hood 12 is provided with an opening surrounded by a fabric tubular member 14. The fabric member 14 is removably connected with the hood and is secured thereon in any desired or preferred manner. The lower inclined wall 7 of the hopper, directly opposite the opening in the hood 12, is also provided with an opening. This opening, however, is covered by a reticulated plate or screen 15 and the said opening is surrounded by a flange 16 on the spout end 17 of a fan casing 18. The flange 16 is, of course, secured to the wall 7 of the hopper 8.

The fan casing has its sides provided with the usual air inlet openings and has journaled centrally therethrough a shaft 19. On this shaft there is fixed a spider member 20, the same including a hub having arms radiating therefrom, and to each of these arms there is secured a blade 21 which is preferably of wood.

On the outer end of the shaft 19 there is secured a pulley 22, and on the shaft 23 for the sprocket wheel 6 there is secured a belt wheel 24. Around the belt wheel and the pulley 22 there is trained an endless belt 25.

Motion is imparted to the chains of the elevator in the usual manner and is transmitted to the shaft for the fan for causing the latter to rotate in the direction of the arrow in Figure 2. The fan forces blasts of air through the screen 15 to remove the silk from the corn which slides on the lower inclined wall of the hopper 8. The silk is forced through the fabric tube 14, and the corn from which the silk has been removed is directed to the bin through the outlet of the hopper and the spout 11.

It is believed from the foregoing description, when taken in connection with the drawings will fully set forth the construction and advantages of my improvement to those skilled in the art to which such inventions relate.

Having described the invention I claim:—

The combination with a corn elevator which includes the usual inclined hopper having an open top and provided with a delivery spout, and having an opening in its bottom which is closed by a screen, of a means for removing fibrous substance from between the ears of corn in their passage through the hopper into the spout, comprising a fan for injecting air through the screen and into the bottom of the hopper and operated by the elevator, a hood closing the open top of the hopper and disposed at an angle opposite the fan inlet and a fabric tube removably secured on the outer face of the hood.

In testimony whereof I affix my signature.

MANTON BAKKER.